Aug. 29, 1950
R. JELINEK
2,520,410
FILM VIEWING DEVICE
Filed April 8, 1946
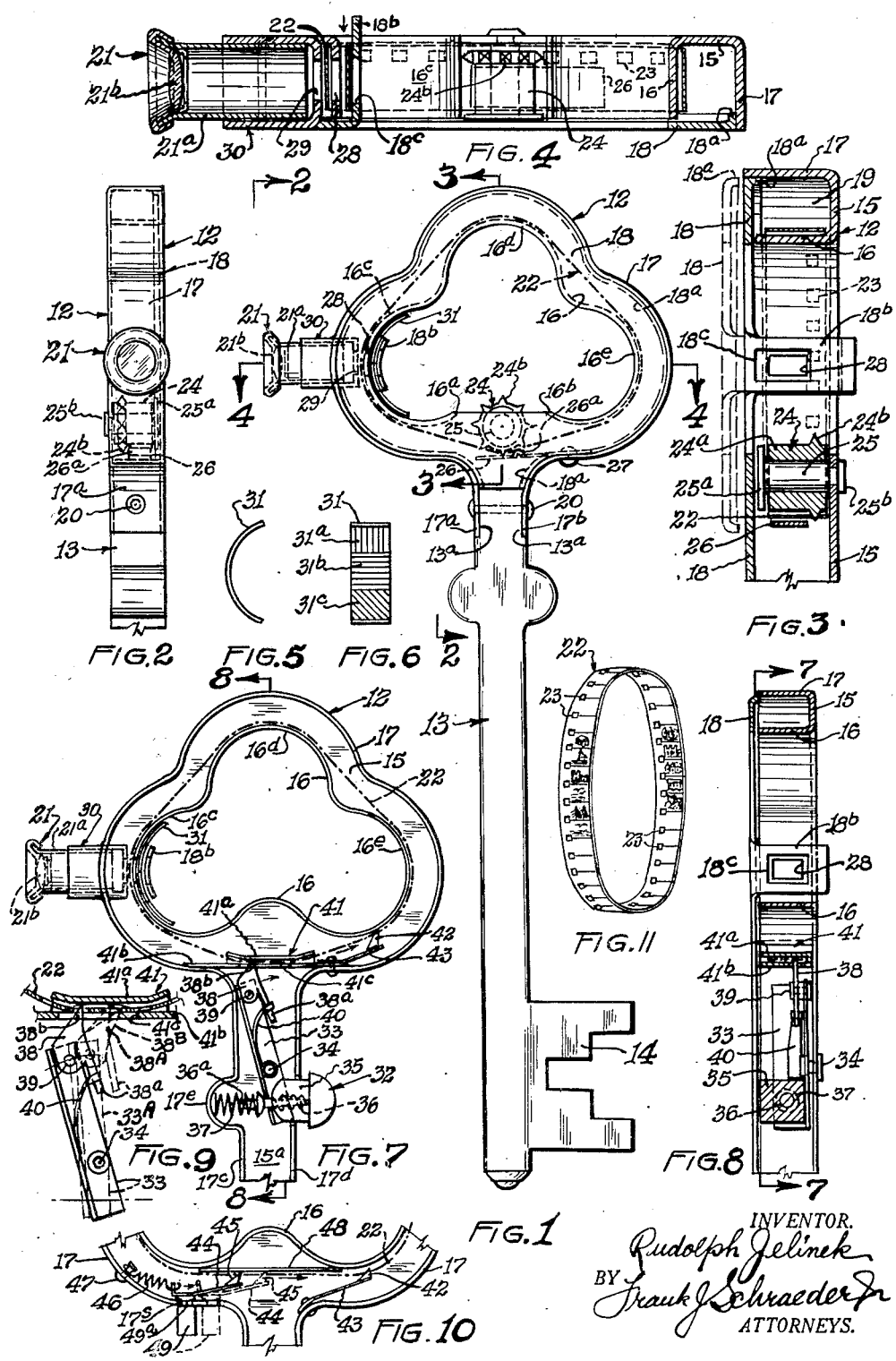
INVENTOR.
Rudolph Jelinek
BY Frank J. Schraeder Jr.
ATTORNEYS.

Patented Aug. 29, 1950

2,520,410

UNITED STATES PATENT OFFICE 2,520,410

FILM VIEWING DEVICE

Rudolph Jelinek, Chicago, Ill.

Application April 8, 1946, Serial No. 660,563

5 Claims. (Cl. 40—96)

This invention relates generally to new and improved film viewing devices and has particular reference to a manually operable device containing an endless film provided with a series of pictures which may be consecutively viewed through a suitable lens-equipped eyepiece while the device is held by the operator in one hand and the endless film propelled by the other hand to progressively periodically move the film past the range of vision through the eyepiece.

Among the objects of my invention is to provide a simple device of the above-described character which comprises a casing enclosing a circuitous path for an endless strip of film containing a series of adjacently disposed pictures, such as scenic or panoramic views or illustrations of an advertising nature or any other desired images adapted to be displayed in color or in black and white character and which device is provided with manually operable means for shifting the film, selectively in opposite directions, to successively present the series of the film images for viewing by the eye of the operator through a suitable eyepiece mounted on one side of the casing-enclosed circuitous film path.

It is also an object of my invention to provide a device of the above-described character in a form to constitute a gift or souvenir preferably in the configuration of a key and which device when so constructed in key form renders my invention suitable for souvenir purposes and for presentation as "The Key to the City" on various municipal and public occasions; the keepsake value of such key-shaped device being enhanced by a series of views of the city in which it is given or sold as a souvenir displayed on the film within the loop of the key; the key form of the device also facilitating the use thereof by providing in the stem part of the key a convenient handle whereby the same may be held in one hand of the operator while the other hand is available for operating the film shifting mechanism.

Another feature of my invention resides in the provision of means whereby the film may be shifted a distance equal to the length of one of the film frames or pictures by each limited movement of a film-shifting button or lever and the film-shifting mechanism being carried within the stem part of the key-shaped structure.

Still another feature of my invention is to provide a device of the above-described character which shall be simple in construction and comparatively inexpensive to manufacture so as to be suitable for sale as a souvenir or to be given away as an advertising medium.

Other features and objects of my invention will become apparent from a perusal of the following specification and the accompanying drawing wherein preferred exemplifications of my invention are illustrated.

In the drawing:

Fig. 1 illustrates a side elevation of a device embodying my invention; the device having the configuration of a key;

Fig. 2 is an end view of the device shown in Fig. 1; the view being taken from the side of the eyepiece;

Fig. 3 is a vertical section taken on line 3—3 of Fig. 1 and slightly enlarged to show more clearly the details;

Fig. 4 is a horizontal section taken on line 4—4 of Fig. 1 and also enlarged to show the details;

Figs. 5 and 6 show respectively end and side views of a color screen;

Fig. 7 illustrates a side view of the casing in the form of the loop part of a key with the side cover plate removed to show a manually operable film shifting device; the view being taken on line 7—7 of Fig. 8;

Fig. 8 is a vertical section taken on line 8—8 of Fig. 7;

Fig. 9 is a slightly enlarged side view of the film shifting device shown in Figs. 7 and 8 and showing the movements of the film engaging pawl;

Fig. 10 is a view of the inner portion of the key loop casing near the key stem showing a modified form of a film-shifting device; and Fig. 11 illustrates the endless film strip.

In one exemplification of my invention as shown in Figs. 1 to 4 inclusive, I show the device in the preferred configuration of a key comprising well-known parts such as the loop 12, the stem 13 and the bit 14, however, the invention must obviously be considered in its broader aspect, namely, as being embodied solely in a casing of loop form providing an endless channel for an endless film in the form of an endless loop movable in a circuitous path in said channel, in fact, a device consisting simply of a loop-formed casing could be manufactured and sold as a slightly less expensive type of device than the key-shaped type shown in Figs. 1 to 4 inclusive, although the key-shaped type has some advantages as pointed out in the hereinabove stated objects of my invention.

As shown in Figs. 1 to 4, the casing which constitutes the loop 12 of the key consists of circuitous channel-like or trough-shaped body having a side wall 15 formed, preferably integrally with a pair of transversely spaced inner and outer peripheral walls, respectively designated by numerals 16 and 17.

The inner wall 16 being shorter than the outer wall 17, that is, terminating in a plane disposed inwardly of the removable cover plate 18 which is of similar configuration as that of the circuitous film compartment 19 defined by the walls 15, 16, 17 and cover plate 18 which is preferably provided with an outer inwardly disposed flange 18a to reenforce the cover along its outer peripheral edge and which flange is adapted to fit within the inner face of wall 17.

The flange 18a is parallel to and close fitting against the wall 17 to frictionally retain the cover and the flange 18a terminates at spaced ends where the extensions 17a and 17b begin to parallel each other, as shown more clearly in Fig. 1.

The inner wall 16 terminates at the spaced ends 16a and 16b to provide an opening therebetween for the film-shifting mechanism. The outer wall 17 terminates in spaced apart parallel extensions 17a and 17b which fit into recesses 13a in the upper end of the stem 13 and a rivet 20 is conveniently shown as securing the stem 13 to and between the casing wall extensions 17a and 17b. Obviously, in any non-key type of loop or oval-shaped casing, the outer wall 17 would be continuous except at the film-viewing portion where the eyepiece, generally designated by numeral 21, is mounted.

In the key design shown, the loop 12 is preferably in the form of a three-leaf clover shape to reduce film wall contact surfaces to the three arcuate wall portions 16c, 16d and 16e and the operative position of the endless film is shown by the dot and dash line 22 in Figs. 1, 7, 9 and 10.

The film 22 shown more clearly in Fig. 11 is provided with a series of pictures in black and white or colored images of the pictorial type or character desired and is also provided with the usual spaced sprocket-engageable perforations 23.

The film-shifting mechanism consists of a sprocket 24, rotatable on pin 25, mounted in the film compartment 19. The sprocket hub 24a is provided with circumferentially spaced teeth 24b adapted to engage within the spaced perforations 23 in the film 22. The sprocket-carrying pin 25 is formed at one end with an enlarged head 25a and the opposite end of the pin is decreased in diameter and headed as at 25b to thereby rigidly support the pin and sprocket in an opening in wall 15 and to assist retainment of the film 22 in positive continuous operative contact with the sprocket 24 a light-weight leaf spring 26 is provided within the compartment 19.

The leaf spring 26 is secured at one end thereof as by a rivet 27 to the outer casing wall 17 and the free end of the spring is preferably provided with a rounded corrugation 26a which continuously contacts the film 22 whereby the leaf spring 26 constitutes resilient means for retaining the film 22 in positive operative contact with the sprocket 24.

The arcuate wall portion 16c is provided with an opening 28 over which the film 22 is moved and this casing opening 28 is axially aligned with a similar opening 29 of the eyepiece sleeve 30 which extends through the outer wall 17 and is rigidly suitably secured thereto. The eyepiece 21 is provided with an axially adjustable lens barrel 21a carrying a suitable magnifying lens 21b also axially aligned with the openings 28 and 29.

To facilitate the quick removal of the cover 18 for inserting into or removing the film 22 from the casing compartment 19, the cover 18 is provided with an integral arcuate extension 18b which extends inwardly of the opening in the key loop 12 and a very small distance from the outer face of the arcuate wall portion 16c and which extension is provided light-admitting opening 18c also axially aligned with the openings 28 and 29. When the outer end of the extension 18b, which projects beyond the outer face of the casing wall 15, is pressed inwardly by the thumb of the operator-user, in the direction indicated by the arrow in Fig. 4, the cover plate 18 is thereby slightly tilted from its closed position to facilitate its complete detachment from the casing.

The extension 18b also functions as a retainer for a flexible plastic color screen 31 which, if the user so elects, may be inserted into frictionally-supported position between the extension 18b and the arcuate wall portion 16c to provide means for viewing the film images in color and for this purpose the color screen 31 is preferably provided with a plurality of differently color-tinted sections such as, for example, the red or pink tinted section 31a, the blue tinted section 31b and the green tinted section 31c and, obviously, the colors may be varied in shade and their relative arrangement.

The color screen 31 may be manually adjusted relatively to the image being viewed. If, for example, a sky and water scene is being viewed, the screen 31 may be so manually positioned that the red tinted section covers the sky portion of the film above the horizon while the blue tinted section covers the water below the horizon. Similarly, in viewing a black and white picture a pastoral scene showing sky and wooded earth, the color screen may be so adjusted that the blue tinted section covers the sky and the green tinted section covers the earth portion of the picture.

The operation of the device shown in Figs. 1 to 4, inclusive, can be readily performed by the operator-user by simply holding the stem 13 of the key-shaped structure in one hand while the other hand is employed to manually turn the sprocket 24 to cause the endless film to shift, in either direction, to successively present the images on the film within the focus of the eyepiece 21 while the operator-user views same with either eye therethrough.

In Figs. 7, 8 and 9, I show manually operable means for shifting the film just one frame or picture at each operation of a depressible button-like actuator 32 and such means consisting of a lever 33 of angular cross-section pivotally mounted, as at 34, within a hollow portion of stem part formed by the extended wall portions 15a, 17c and 17d; the cover plate 18 being also similarly extended to cover the mechanism in the stem part.

The actuator 32 consists of a round-headed pin, preferably of wood, having a stem 35 movable within an opening in the extended wall portion 17d. A screw 36 is loosely carried in an opening in one leg of the lever 33 and its threaded end is secured in the inner end of the stem 35. The head of the screw 36 is provided with an integral stud 36a about one end of which is coiled the coil spring 37 of which the opposite end is in abutment with bulged wall portion 17e.

The spring 37 normally retains the actuator 32 in its outward position and at the same time retains the lever 33 in its normal inoperative position as shown in Fig. 7.

Carried on the upper free end of lever 33 is a pawl 38 pivotally mounted on the lever at 39, having downwardly disposed extension 38ª engaged by the free end of a leaf spring 40 anchored at the opposite end about the pivot pin 34; the spring 40 acting to retain the pawl 38 in normal operative position relatively to its supporting lever 33.

The film 22 is mounted for movement through an elongated channel member 41 whose passage is defined by the three side walls of the body of such member. The upper wall 41ª being shorter than the bottom wall 41ᵇ which spans the space between the spaced wall portions 17ᶜ and 17ᵈ and such extended bottom wall 41ᵇ being provided with a longitudinal slot 41ᶜ in which the pointed operative end 38ᵇ of the pawl 38 is operatively movable.

To shift the film 22 across the field of vision through the eyepiece 21, the actuator button 32 is depressed, as by the index finger of the user's right-hand. The inward movement of the actuator stem 35 against the pressure of spring 37 causes a swinging movement of the upper end of lever 33 to the right, as viewed in Fig. 7, whereby the pointed end 38ᵇ of the pawl 38 is brought into engagement within one of the film perforations 23 to thereby shift the film a distance equal to the length of one of the film images or pictures.

When the actuator 32 is released, the spring 37 moves the actuator outwardly back into inoperative position and at the same time causes the lever to swing into its inoperative position and, during such return movement of the lever 33, the pawl 38 is tilted about its pivot 39 moving the pointed end out of the perforation 23 so that its angular end face freely slides along the under side of the film back into inoperative position. These operations of the lever 33 and pawl 38 are illustrated by the positions shown in broken lines in Fig. 9 wherein the positions of the lever and pawl designated by respectively 33ᴬ and 38ᴬ shows these elements just after the film has been shifted a distance of one picture; the position of the pawl designated by 38ᴮ is the tilted position of the pawl 38 while being retracted from the film perforation 23.

To insure any possible return movement of the film during the return of the lever 33 and pawl 38 into normal inoperative position, a one-way stop dog is provided which consists of a tapered tooth 42, carried on the free end of a light leaf spring 43 which is riveted to the overlapping walls 41ᵇ and 17; the tapered tooth 42 being disposed within one of the film perforations 23 after each shift of the film 22 to prevent its reverse movement.

Other various ways and means for shifting the film 22 a distance of one picture upon each operation of an actuator may be provided, as for example, the modified film-shifting means illustrated in Fig. 10 wherein the shifting arm 44 consists of a resilient blade carrying at its forward operative end a tapered pusher 45 engageable within a film perforation 23 to thereby shift the film a distance of one picture when moved by its handle 49 which is rigidly secured to the blade arm 44 and the reduced neck 49ª of which handle is slidable in a slot 17ˢ in wall 17. The shifting arm 44 being automatically returned into inoperative position by a coil spring 46 one end of which is connected to the rear end of the shifting arm 44 and its other end secured as to a rivet 47 in wall 17.

A one-way stop dog 42 carried on the leaf spring 43 is also provided in the modification shown in Fig. 10.

In the modified shifting means shown in Fig. 10 the channel member 41 shown in Figs. 7, 8 and 9 is not employed and, in lieu of same, a film-supporting bridge plate 48 is secured to spaced portions of the inner casing wall 16 and this wall 48 acts to retain the film while it is engaged by the taper pusher 45; the angular rear wall of the pusher 45 permitting the pusher 45 to slide out of engagement with the edge of the perforation 23 when same is retracted by the coil spring 46.

While the hereinabove device is described as adapted to or operable with a commonly known translucent flexible plastic film, such as for example, a photographic strip film, I do not wish to be understood as limiting my device to the use of such particular strips of translucent material, as obviously, the device is readily operable with any other strip of translucent material having black and white or colored pictures or images imposed thereon in any suitable manner as, for example, pictures or images litographically or photographically imposed upon a thin translucent strip of paper or parchment and therefore my use of the term "film" in the claims is definitive of any suitable flexible translucent material in strip form.

Various changes and modifications may readily be made in the herein illustrated preferred embodiments of my invention by those skilled in the art to which my invention appertains without departing from the spirit and scope of the invention as defined in the appended claims.

I claim:

1. A film viewing device comprising a casing of multi-arcuate contiguously arranged channel-shaped portions forming a circuitous configuration in side view defining and encompassing an open area within the inner side of the circuitous configuration, said casing having an inner, an outer, a side and a cover wall which between them define a closed circuitous chamber, an endless translucent film comprised of a plurality of individual pictures, said film being positioned for longitudinal movement in said chamber, said casing inner wall being so arcuately formed as to provide spaced outwardly directed arcuate supporting surfaces for said film, said casing inner and outer walls each having an opening therein in horizontal register with the opening in the other, an eye-piece mounted in said outer wall opening, said film being interposed between said eye-piece inner end and the inner wall opening opposite the latter, and means for moving said film in said casing in the direction of its length to selectively bring individual pictures thereon into focal alignment with said eye-piece and the opening in said inner wall for viewing while illuminated by light entering said inner wall opening through the open area between the circuitous portions of said casing.

2. A film viewing device comprising a casing of circuitous centrally open configuration having a side wall and laterally spaced inner and outer walls defining with said side wall a circuitous passage, each of said inner and outer walls having an opening therein aligned transversely with that in the other, a transparent film having a plurality of images thereon positioned for movement in said passage, an eyepiece mounted on the outer wall in focal alignment with said openings, means supported on said casing adapted to be manually actuated to move said film past said openings to successively bring the images on said film into focal register with said eyepiece; and a cover removably supported on the free edges of said inner and outer walls; said cover having an extension disposed adjacent to the inner wall and provided with a light-admitting opening axially aligned with said pair of openings.

3. A film viewing device as set forth in claim 2 wherein said extension is formed integrally with said cover and is disposed closely adjacent to the exposed face of the inner one of said walls for frictionally holding a color screen between said exposed face and said extension.

4. A film viewing device as set forth in claims 2 and 3 wherein said color screen is flexible and has a plurality of differently color-tinted areas and is manually adjustable relatively to the image on the film in focal register with said opening in said extension to thereby present one or more of said color-tinted areas of the screen within the range of said transversely aligned openings.

5. A film viewing device comprising a casing of circuitous centrally open configuration having a side wall and laterally spaced inner and outer walls defining with said side wall a circuitous passage, each of said inner and outer walls having an opening therein aligned transversely with that in the other, a transparent endless film provided with a plurality of longitudinally spaced perforations and having a plurality of images thereon and positioned for movement in said passage, an eyepiece mounted on the outer wall in focal alignment with said openings, a manually rotatable sprocket partially projecting through an opening in the inner one of said walls for manual operative engagement thereat, said sprocket being engageable with said perforations to move said film selectively in opposite directions in response to rotations of said sprocket, and a cover removably mounted on said inner and outer walls.

RUDOLPH JELINEK.

REFERENCES CITED

The following references are of record in the file of this patent:

UNITED STATES PATENTS

| Number | Name | Date |
| --- | --- | --- |
| 1,350,374 | Michalek | Aug. 24, 1920 |
| 1,406,120 | Waters | Feb. 7, 1922 |
| 1,626,841 | Kelley et al. | May 3, 1927 |
| 2,146,237 | Stephens | Feb. 7, 1939 |
| 2,408,384 | Farrell | Oct. 1, 1946 |